US009183220B2

(12) United States Patent
Frieder et al.

(10) Patent No.: US 9,183,220 B2
(45) Date of Patent: *Nov. 10, 2015

(54) HIERARCHICAL STRUCTURED DATA ORGANIZATION SYSTEM

(71) Applicants: Ophir Frieder, Chevy Chase, MD (US); Sanjiv Kapoor, Naperville, IL (US)

(72) Inventors: Ophir Frieder, Chevy Chase, MD (US); Sanjiv Kapoor, Naperville, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,151

(22) Filed: Sep. 17, 2014

(65) Prior Publication Data

US 2015/0074562 A1    Mar. 12, 2015

Related U.S. Application Data

(63) Continuation of application No. 14/147,233, filed on Jan. 3, 2014, which is a continuation-in-part of application No. 13/486,630, filed on Jun. 1, 2012, now Pat. No. 8,626,792, which is a continuation of (Continued)

(51) Int. Cl.
*G06F 17/30* (2006.01)
*G06F 17/22* (2006.01)
*G06F 3/0481* (2013.01)

(52) U.S. Cl.
CPC ........ *G06F 17/30221* (2013.01); *G06F 3/0481* (2013.01); *G06F 17/2241* (2013.01); *G06F 17/301* (2013.01); *G06F 17/30126* (2013.01); *G06F 17/30312* (2013.01)

(58) Field of Classification Search
CPC .............. G06F 17/2241; G06F 17/301; G06F 17/30312; G06F 17/30079; G06F 17/22; G06F 17/30327; G06F 17/30598; G06F 3/048; G06F 3/04817; G06F 3/04842; G06F 3/0484; G06F 3/0482; G06F 17/2247; G06F 17/30082; G06F 17/30554; G06F 17/30221; G06F 17/30126; G06F 3/0481
USPC ......... 707/797, 722, 705, 706, 737, 778, 740, 707/784, 802, 805, 829, 828, 822, 755, 756, 707/777, 652, E17.107, E17.005, E17.014, 707/E17.009, E17.047; 715/234, 239, 254, 715/273, 256, 265, 274, 760, 781, 721, 713, 715/784, 769, 841, 835, 823, 243, 853, 810, 715/733, 736; 709/246, 218, 217, 230, 231; 704/1, 4, 7, 9, 10
See application file for complete search history.

(56) References Cited

U.S. PATENT DOCUMENTS 5,355,497 A   10/1994   Cohen-Levy
5,544,360 A   8/1996    Lewak et al.

(Continued)

OTHER PUBLICATIONS

"DocPlayer: why doesn't your desktop play this way?" by Kevin Mcgee , Jody Foo—citeseerx.ist.psu.edu/viewdoc/summary?doi=10.1.1.60.2133—Department of Computer and Information Science—LinkSping University—URL http://www, ida. liu. se/~ kevmc/pubs/mcgee- . . . , 2006—Citeseer—pp. 1-8.*

(Continued)

*Primary Examiner* — Anh Ly
(74) *Attorney, Agent, or Firm* — Pauley Erickson & Kottis

(57) ABSTRACT

A method in a data processing system and apparatus for organizing files or web pages, structured or unstructured, of multiple users stored across one or more server computers into hierarchical file structures on a recordable medium of a data processing system. A user-defined metalabel is assigned to each of the electronic files or web pages. The electronic files or web pages are organized as a function of the metalabels into the hierarchical file structures.

29 Claims, 10 Drawing Sheets

Related U.S. Application Data application No. 12/471,938, filed on May 26, 2009, now Pat. No. 8,209,358, which is a continuation-in-part of application No. 11/801,296, filed on May 9, 2007, now Pat. No. 7,720,869.

(56) References Cited

U.S. PATENT DOCUMENTS

| | | | |
|---|---|---|---|
| 5,644,736 A | 7/1997 | Healy et al. | |
| 5,678,046 A | 10/1997 | Cahill et al. | |
| 5,689,701 A | 11/1997 | Ault et al. | |
| 5,848,415 A | 12/1998 | Guck | |
| 5,905,990 A | 5/1999 | Inglett | |
| 6,252,597 B1 | 6/2001 | Lokuge | |
| 6,321,251 B1* | 11/2001 | Deisinger et al. | 709/203 |
| 6,344,861 B1 | 2/2002 | Naughton et al. | |
| 6,348,935 B1 | 2/2002 | Malacinski et al. | |
| 6,453,337 B2* | 9/2002 | Miller et al. | 709/204 |
| 6,457,045 B1* | 9/2002 | Hanson et al. | 709/206 |
| 6,463,461 B1* | 10/2002 | Hanson et al. | 709/204 |
| 6,507,865 B1* | 1/2003 | Hanson et al. | 705/36 R |
| 6,567,371 B1 | 5/2003 | Otomo et al. | |
| 6,582,474 B2 | 6/2003 | LaMarca et al. | |
| 6,594,675 B1 | 7/2003 | Schneider | |
| 6,633,903 B1* | 10/2003 | Gould | 709/205 |
| 6,748,160 B1 | 6/2004 | Otomo et al. | |
| 7,051,277 B2 | 5/2006 | Kephart et al. | |
| 7,107,416 B2 | 9/2006 | Stuart et al. | |
| 7,146,388 B2 | 12/2006 | Stakutis et al. | |
| 7,254,570 B2 | 8/2007 | Stickler | |
| 7,293,033 B1 | 11/2007 | Tormasov et al. | |
| 7,305,377 B2 | 12/2007 | Shinkai et al. | |
| 7,526,621 B2 | 4/2009 | Stuart et al. | |
| 7,720,869 B2 | 5/2010 | Frieder et al. | |
| 7,836,411 B2 | 11/2010 | Plow et al. | |
| 7,853,668 B2* | 12/2010 | Daniell et al. | 709/217 |
| 7,945,535 B2 | 5/2011 | Toutonghi et al. | |
| 8,209,358 B2 | 6/2012 | Frieder et al. | |
| 8,510,668 B1* | 8/2013 | Raskin | 715/767 |
| 8,626,792 B2 | 1/2014 | Frieder et al. | |
| 8,627,222 B2* | 1/2014 | Hartwell et al. | 715/764 |
| 2001/0041989 A1 | 11/2001 | Vilcauskas et al. | |
| 2001/0042087 A1* | 11/2001 | Kephart et al. | 707/530 |
| 2003/0033287 A1* | 2/2003 | Shanahan et al. | 707/3 |
| 2003/0061200 A1* | 3/2003 | Hubert et al. | 707/3 |
| 2003/0061201 A1* | 3/2003 | Grefenstette et al. | 707/3 |
| 2003/0110188 A1* | 6/2003 | Howard et al. | 707/200 |
| 2003/0163519 A1 | 8/2003 | Kegel et al. | |
| 2003/0204515 A1 | 10/2003 | Shadmon et al. | |
| 2003/0229612 A1* | 12/2003 | Keller et al. | 707/1 |
| 2004/0037540 A1 | 2/2004 | Frohlich et al. | |
| 2004/0125124 A1* | 7/2004 | Kim et al. | 345/716 |
| 2004/0172442 A1 | 9/2004 | Ripley | |
| 2005/0114356 A1 | 5/2005 | Bhatti | |
| 2005/0138109 A1* | 6/2005 | Redlich et al. | 709/201 |
| 2005/0144022 A1 | 6/2005 | Evans | |
| 2005/0144162 A1* | 6/2005 | Liang | 707/3 |
| 2005/0177567 A1 | 8/2005 | Hughes et al. | |
| 2005/0216457 A1* | 9/2005 | Walther et al. | 707/4 |
| 2006/0015482 A1 | 1/2006 | Beyer et al. | |
| 2006/0031261 A1 | 2/2006 | Behringer | |
| 2006/0036568 A1* | 2/2006 | Moore et al. | 707/1 |
| 2006/0047692 A1 | 3/2006 | Rosenblum et al. | |
| 2006/0074925 A1 | 4/2006 | Bixby et al. | |
| 2006/0080465 A1 | 4/2006 | Conzola et al. | |
| 2006/0106866 A1* | 5/2006 | Green et al. | 707/104.1 |
| 2006/0129569 A1 | 6/2006 | Dieberger et al. | |
| 2006/0161863 A1 | 7/2006 | Gallo | |
| 2006/0184892 A1* | 8/2006 | Morris | 715/767 |
| 2006/0206449 A1 | 9/2006 | Fletcher et al. | |
| 2006/0206450 A1 | 9/2006 | Fletcher et al. | |
| 2006/0235871 A1 | 10/2006 | Trainor et al. | |
| 2006/0282440 A1 | 12/2006 | Fletcher et al. | |
| 2006/0287974 A1 | 12/2006 | Mochizuki et al. | |
| 2007/0070066 A1* | 3/2007 | Bakhash | 345/419 |
| 2007/0156636 A1* | 7/2007 | Norton et al. | 707/1 |
| 2007/0204011 A1 | 8/2007 | Shaver et al. | |
| 2007/0209005 A1 | 9/2007 | Shaver et al. | |
| 2007/0291291 A1 | 12/2007 | Vilar et al. | |
| 2008/0016472 A1* | 1/2008 | Rohlf et al. | 715/848 |
| 2008/0216009 A1 | 9/2008 | Drallos | |
| 2008/0235197 A1 | 9/2008 | Allen et al. | |
| 2008/0281788 A1 | 11/2008 | Frieder et al. | |
| 2008/0307339 A1 | 12/2008 | Boro et al. | |
| 2009/0113350 A1* | 4/2009 | Hibino et al. | 715/853 |
| 2009/0119354 A1 | 5/2009 | Stuart et al. | |
| 2009/0228462 A1 | 9/2009 | Frieder et al. | |
| 2010/0031193 A1 | 2/2010 | Stark et al. | |
| 2010/0198612 A1* | 8/2010 | Streepy, Jr. | 705/2 |
| 2014/0122529 A1 | 5/2014 | Frieder et al. | |

OTHER PUBLICATIONS

Sabel F. Cruz and Gerard T. McGuire—"Publication and customization of electronic documents using PANDA"—Proceeding SIGDOC '99 Proceedings of the 17th annual international conference on Computer documentation—ACM New York, NY, USA 1999—pp. 58-64.* http://ww/apple.com/macosx/features/spotlight/Apple-Mac OS X—Spotlight (2 pages), web pages printed Aug. 1, 2007 (Apple's Spotlight was originally introduced in Apr. 2005).

http://msdn.microsoft.com/msdnmag/issues/04/01/WinFS/ Code Name WinFS: Revolutionary File Storage System Lets Users Search and Manage File Based on Content Jan. 2004, (11 pages).

Alexander Ames et al., "Richer File System Metadata Using Links and Attributes," Proceedings of the 22nd IEEE/13th NASA Goodard Conference on Mass Storage Systems and Technologies (MSST 2008), Monterey, CA, Apr. 2008, (12 pages).

Stephan Bloehdorn et al., "TagFS—Tag Semantics for Hierarchical File Systems," Proceedings of the 6th International Conference on Knowledge Management, Graz, Austria (Sep. 6-8, 2006), (8 pages).

David K. Glifford et al, "Semantic File Systems," Proceedings of the 13th ACM Symposium on Operating Systems Principles, New York, NY, (1991) (10 pages) (the year of the Publication is sufficiently earlier than the effective U.S. filing date so that the particular month of publication is not an issue).

Charles P. Wright et al., "Versatility and Unix Semantics in a Fan-Out Unification File System", Technical Report FSL-04-01b (Jan. 2004) (14 pages).

M. Mahalingam et al., "Towards a Semantic, Deep Archival File System," Technical Report HPL-2002-199, HP Laboratories, Palo Alto, Jul. 2002, (7 pages).

M. Olson, "The Design and Implementation of the Inverstion File System," In proceedings of the Winter 1993 USENIX Technical Conference, pp. 205-217, San Diego, California, USA, Jan. 1993, (14 pages).

Y. Padioleau et al., "A Logic File System," In proceedings of the 2003 USENIX Annual Technical Conference, pp. 99-112, San Antonio, Texas, Jun. 2003, (28 pages).

Candan et al., "Resource Description Framework: Metadata and Its Applications," SIGKDD Exploration Newsletter, vol. 3, Issue 1, Jul. 2001 (pp. 1-14).

Sunil Singh Parihar, "MediaAssit-Managing Digital Picture Collections Through Content Trails," Georgia Tech, Design and Technology, Spring 2000 (pp. 1-26).

Isabel F. Cruz et al., "Publication Customization of Electronic Documents suing PANDA", Proceedings SIGDOC '99 Proceedings of the 17th Annual International Conference on Computer Documentation, 1999, pp. 58-64.

Kevin McGee et al., "DocPlayer: why doesn't your desktop play this way?", Dept. of Computer & Information Science, Linköping University, http://www.ida.liu.se/~kevmc/pubs/mcgee- . . . , 2006, Citeseer, pp. 1-8.

* cited by examiner

HIERARCHICAL STRUCTURED DATA ORGANIZATION SYSTEM

CROSS REFERENCE TO RELATED APPLICATIONS

This application is a continuation of U.S. application Ser. No. 14/147,233, filed on 3 Jan. 2014, which is a continuation-in-part of U.S. application Ser. No. 13/486,630, now U.S. Pat. No. 8,626,792, filed on 1 Jun. 2012, which is a continuation of U.S. application Ser. No. 12/471,938, filed on 26 May 2009, now U.S. Pat. No. 8,209,358, which is a continuation-in-part of U.S. application Ser. No. 11/801,296, filed on 9 May 2007, now U.S. Pat. No. 7,720,869. The co-pending parent application is hereby incorporated by reference herein in its entirety and is made a part hereof, including but not limited to those portions which specifically appear hereinafter.

BACKGROUND OF THE INVENTION

1. Field of the Invention

This invention is directed to improving the searching and/or organizing electronic data in a data processing system or web site.

2. Discussion of Related Art

Traditional file systems, including both UNIX and WINDOWS, have one hierarchical method of file organization, herein referred to as a traditional or first hierarchical file structure, which is tree structured with directories and subdirectories. A typical user may have a large set of files (say 100,000), and the structured tree file organization can be several levels in height. The primary characteristics of the file systems are: 1) a file is accessed by a unique address known as the file path; and 2) file organizing is by using server names, directories, subdirectories, and/or filenames with an extension.

This single method of organizing data leads to considerable inefficiencies in accessing files. Searching is effective when the user knows a partial filename and/or the file path or directory under which the file is stored. Often a user must go through a number of files before locating a set of relevant files, and must open a number of directory/subdirectory folders to access the files. Further the current hierarchical organizing technique does not allow the users to easily describe or annotate a file.

To improve the search, current file systems use a variety of techniques. As an example, Mac OS uses a SPOTLIGHT feature that indexes files on your computer in the background based upon keywords. When a user makes a change, such as adding a new file, receiving an email, or entering a new contact, SPOTLIGHT updates its index automatically, with the intention of keeping search results accurate. Embedding keywords into files is a common technique for providing a search facility to the user. Keywords are generally indexed in a database that is used to answer user queries.

There is a need for an improved method for organizing and searching files or other data on a computer or web site, as well as organizing the search results.

SUMMARY OF THE INVENTION

A general object of the invention is to provide an improved method for organizing and searching for electronic files or data on a computer-readable recordable medium, and the apparatus and/or program code(s) for carrying out the method in a data processing system.

The general object of the invention can be attained, at least in part, through a method in a data processing system of searching electronic files that are on a recordable medium of the data processing system. The method includes: providing electronic files or websites in one or more first hierarchical file structures, such as each belonging to a plurality of users, the electronic files or websites being identified by filename, file path, and/or domain address; assigning user-defined metalabels to the electronic files or websites, wherein the electronic files or websites include the filenames or domains and the metalabels; and organizing the electronic files and/or websites into a second hierarchical file structure as a function of the metalabels. The second hierarchical file structure is achieved without replicating the files of the first hierarchical file structure.

The method of this invention provides an additional file and/or data organization system that extends the file organization into a multi-hierarchy user defined system. The additional hierarchical file structures of this invention are abstract data file structures, as they exist in the background and are not conventionally viewed through a user interface like the traditional file directories, subdirectories, and filenames. However, they can also be viewed in the same way although their physical existence will be according to the first hierarchy. In the system of this invention the data are organized into multiple hierarchical forms which aid considerably in searching and organizing search results, i.e., files, in a structured fashion.

As an example consider the following structure (directories/subdirectories) of electronic files, represented in FIG. 1.

Pictures/2006/Dad
Pictures/2005/Dad
Pictures/2006/Mom
Pictures/2005/Mom
Picture/2006/Baby
Pictures/2005/Baby If a user wanted to access all files which involve dad, even files not having "Dad" in the filename but including dad in the picture, the number of files may be substantial and spread among multiple subdirectories. Thus, if you were looking for all dad-related pictures, it would be desirable that these pictures may be classified as below, and as shown in the abstract directory structure of FIG. 2.

Pictures/Dad/2005
Pictures/Dad/2006
Pictures/Dad/Baby
Pictures/Dad/Mom

The method of this invention provides a way to provide, in a general sense, multiple organizational tree structures for the same electronic files in addition to the traditional file directory tree structure. These additional hierarchical file structures are provided by this invention by structuring the electronic files in one or more abstract directories according to user-defined metalabels. When the user searches based upon an assigned metalabel, the program code implementing this invention provides the corresponding electronic files in a new file directory, such as shown in FIG. 2. As the directory of FIG. 2 exists as a result of wanting all pictures identified by the metalabel "dad", the directory of FIG. 2 is an abstract directory that is created in response to a query for the "dad" metalabel and exists simultaneously with, and does not replace or alter, the first hierarchical file structure of FIG. 1.

The methods and file structures according to this invention can also be applied to organizing web pages and member users of social networking web sites. The invention further includes a method for organizing files, web pages, or web site members. The method includes assigning a user-defined metalabel for each of a plurality of electronic files, web pages, or web site members, where each metalabel is an identifier in addition to a filename, a domain address, or a member identification, and more than one of the plurality of electronic files, web pages, or web site members is assigned the same user-defined metalabel. The method further includes automatically organizing user-defined metalabels in a hierarchical file structure with a data processor where the hierarchical file structure comprises a trie, storing each of the user-defined metalabels in a database associated with the data processor, and linking each of the stored user-defined metalabels to one or more corresponding electronic files, web pages, or web site members of the user-defined metalabel.

The invention further includes the aggregation of metalabels of multiple users in additional hierarchical file structures. In one embodiment, the underlying data (e.g., the files or websites) has a metalabel identifier that is encoded and searchable on the corresponding hardware or computer system. A data processor according to this invention, such as controlled by a further or 'super' user beyond the multiple users, maps the multiple user identifiers and structures the metalabel identifiers into multiple hierarchies to thereby define multiple taxonomies on the space of files. These hierarchies can be viewed by a GUI or browser system, if desired, and provide alternate views or taxonomy on the underlying data space.

Embodiments of this invention include a computer-implemented method for organizing files or web pages, the method comprising: automatically determining with a data processor user-defined metalabels of a plurality of users (e.g., a plurality of different computer systems) for each of a plurality of electronic files or web pages; and the data processor automatically aggregating the metalabels of the plurality of user into a plurality of hierarchical file structures. In some embodiments the method includes: automatically determining with a data processor first user-defined metalabels of a first user for each of a plurality of first user electronic files or web pages; automatically determining with a data processor second user-defined metalabels of a second user for each of a plurality of second user electronic files or web pages; and the data processor automatically aggregating the first user-defined metalabels and the second user-defined metalabels into a plurality of hierarchical file structures. Each of the plurality of user-defined metalabels in the plurality of hierarchical file structures desirably, but not necessarily, provides a server computer location of the each of the plurality of electronic files or web pages, such as for querying purposes.

The invention also includes an apparatus for organizing files, web pages, or web site members, that includes a taxonomy handler comprising a processor and a database and for receiving and storing user-defined metalabels for electronic files or web pages in user file structures of a plurality of users. Each metalabel is an identifier in addition to a user filename or a user domain address, to organize the electronic files or web pages as a function of the metalabels into a plurality of additional hierarchical file structures existing simultaneously with the user file structures. More than one of the plurality of electronic files or web pages is assigned a same user-defined metalabel to organize the more than one of the plurality of electronic files or web pages in a same additional hierarchical file structure. The plurality of additional hierarchical file structures can be overlapping file structures, and the plurality of users can each include a different computer. Software code stored on a recordable medium and executable by the taxonomy handler desirably establishes and maintains the additional hierarchical file structures.

Embodiments of the invention include a web-scan system for automatically scanning remote web pages on a network and creating metalabels for each of the web pages from text extracted from the web pages.

Other objects and advantages will be apparent to those skilled in the art from the following detailed description taken in conjunction with the appended claims and drawings.

DEFINITIONS

Figure 1:
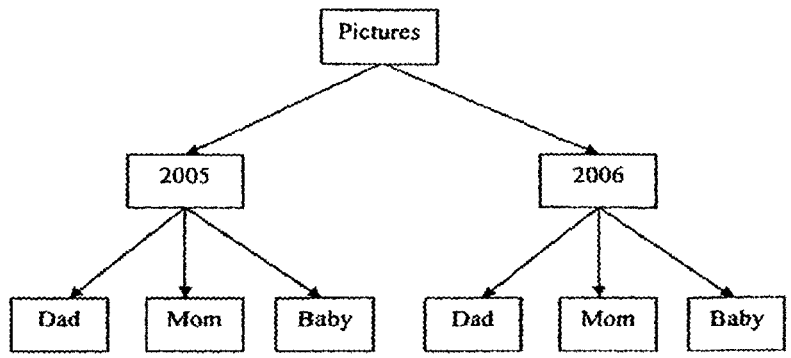
FIG. 1 is a simplified representation of traditional hierarchical file structure.

Within the context of this specification, each term or phrase below will include the following meaning or meanings.

References herein to "metalabel" are to be understood to refer to an identifier given to an electronic file, web page, or web site member in addition to the file's filename and/or file path, a web page's domain address, or the web site member's member identification name. A metalabel of this invention can include any combination of characters, e.g., letter or numbers, and desirably includes a term that a user identifies with the file.

References herein to "user" are to be understood to not be limited to a creator of an electronic file, but can be any person, process, or autonomous software agent, as known in the art, acting on behalf of a user having access to the electronic files.

References herein to a "first hierarchical file structure" or a "traditional hierarchical file structure" are interchangeable and to be understood to refer to the already existing directory tree structure commonly used in organizing electronic files in data processing systems. The first or traditional hierarchical file structure generally includes a plurality of directories and subdirectories, and individual files are given a filename and a file's placement in the tree structure is identified by a file path.

References herein to the "second hierarchical file structure" or "additional hierarchical file structure(s)" of this invention are interchangeable and to be understood to refer to a different hierarchical file or data structure than the first or traditional hierarchical file structure.

References herein to "abstract directory" are to be understood to refer to a directory in or created for the second hierarchical file structure of this invention.

DESCRIPTION OF PREFERRED EMBODIMENTS

The present invention provides a method in a data processing system, e.g., a computer, for organizing and of searching electronic files on a recordable medium of one or more data processing systems, e.g., computer hard drives or flash drives. It is important to note that this invention is not limited to recordable medium that is physically adjacent to a computer. Instead, it is also within the scope of this invention that some and possibly all of the files reside in remote locations whose access is via a network including but not limited to such networks as local area networks, wide area networks, private virtual networks, ad hoc networks, and the Internet.

Also, users according to this invention, as defined above, are not limited to human users. That is, as known in the art, processes or other autonomous software agents can assist or even replace humans in terms of computer processing. Thus, it is within the scope of this invention for processes or software agents to generate the user request described herein.

The method of this invention improves searching for electronic files in, for example, current existing hierarchical file structures, such as are formed of the directories and subdirectories currently employed in operating systems. In such traditional hierarchical file structures, often referred to as tree structures, each of the electronic files includes a given filename that is seen by the user through a user interface, e.g., computer monitor, and a file path identifying the location within the hierarchical file structure.

As discussed above, current searching of the electronic files in the traditional hierarchical file structure, as represented in FIG. 1, is typically based upon the filename or other information about the file itself, such as the file type or extension. The method of this invention provides a second hierarchical file structure, and desirably a plurality of additional hierarchical file structures. These additional hierarchical file structures are "abstract" in that they remain in the background, do not require a physical presence that is directly accessible to the user through the user interface, as does the first hierarchical file structure, but may be viewable in a similar fashion. The abstract additional hierarchical file structures of this invention supplement, and do not replace or replicate portions of the first hierarchical file structure to improve searching of the electronic files in the hierarchical file structure.

In one embodiment of this invention, each of at least a portion of the electronic files stored in one or more data processing systems is assigned a user-defined metalabel. The computer code that implements all or portions of the method of this invention receives the user-defined metalabel, such as through a keyboard, and assigns the metalabel to the intended electronic file. The metalabel does not supplant the file name or file path of the electronic file.

Figure 2:
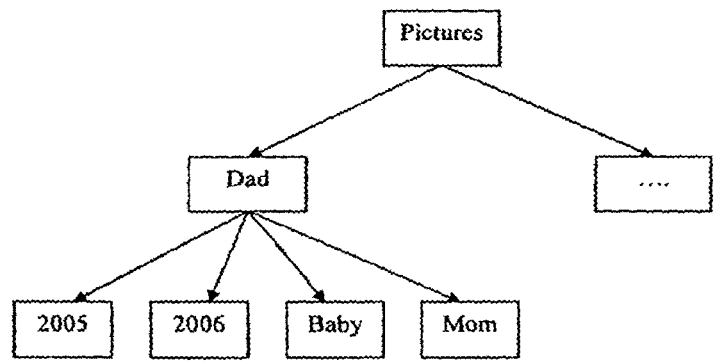
FIG. 2 is an exemplary abstract directory structure adapted from the traditional hierarchical file structure of FIG. 1, according to one embodiment of this invention.

The metalabel of this invention provides users with the possibility to describe or annotate a file with user defined words and/or numbers, which allows another way to search for the files. The electronic files are searched in this invention by querying the metalabels. For example, the data processing system receives a query from a user, searches the metalabels of the second hierarchical file structure according to the query, and returns to the user the search results, which include the electronic file or files including a metalabel matching the query. In one embodiment, the search results are provided in or by an abstract directory structure, such as illustrated in FIG. 2. The query can include the full metalabel, or a portion of the metalabel. In one embodiment of the invention, the query can include a portion of the metalabel coupled with a wildcard symbol, such as, for example, an asterisk or other character, to represent one or more letters or numbers.

In one embodiment of this invention, a program code organizes the electronic files as a function of the metalabels into a second hierarchical file structure existing simultaneously with the first hierarchical file structure on the recordable medium of the data processing system. A plurality of metalabeled electronic files are organized into one or more additional hierarchical file structures by linking each metalabel of the electronic files to a matching metalabel assigned to one or more of the other electronic files. Each metalabel that is assigned to an electronic file is linked to a matching metalabel, should such a matching metalabel exist, of an other electronic file. The link between the metalabels remains even when one or more electronic files are, for example, moved or given a new file name. The additional file structures provided by the metalabels are desirably automatically updated when, for example, an electronic file is moved within, copied, or deleted from the first and traditional hierarchical file structure.

In one embodiment of this invention, hierarchical metalabels have the form:

| (i) | <metalabel> or |
|---|---|
| (ii) | <metalabel1>/<metalabel2>/ . . . <metalabelk>. |

Figure 3:
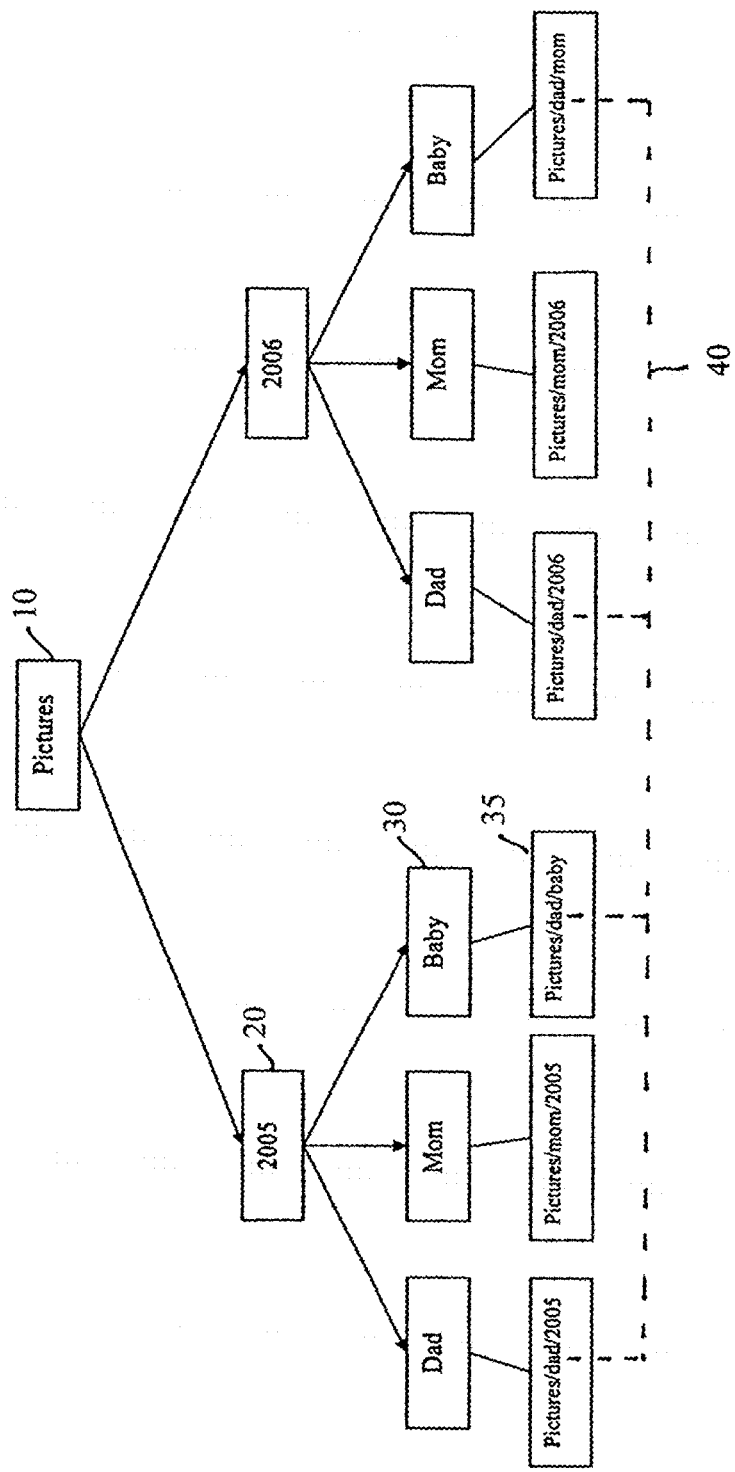
FIG. 3 represents a simplified application of metalabels to electronic files in the traditional hierarchical file structure of FIG. 1, according to one embodiment of this invention.

Metalabel form (i) provides a flat result with all the search results in one single abstract directory. Metalabel form (ii) supports structured searching and reporting. As an example referring to the file structure of FIG. 1, the following metalabels could be assigned to electronic files therein as shown in FIG. 3:

Pictures/dad/2005
Pictures/dad/2006
Pictures/dad/baby
Pictures/dad/mom
Pictures/mom/2005
Pictures/mom/2006

A query for "Pictures/" would provide an abstract directory with the subdirectories "dad/" and "mom/" and the search for "Pictures/dad" would provide an abstract directory with the subdirectories "2005/", "2006/", "baby/", and "mom!". In general, a search for <Dir>/ provides all files labeled <Dir>/<file> and all directories, <dir>, of files labeled */<Dir>/<dir>/*. As will be appreciated by those skilled in the art following the teachings herein provided, directories may also be assigned metalabels with the same methodology as described herein for individual files.

The metalabels allow a system user to further describe or label a file according to, for example, the content or purpose of the file. Referring to FIG. 3, the electronic file 35 is in subdirectory 30 named "Baby", which is in subdirectory 20 named "2005", which is in directory 10 named "Pictures". The user, e.g., the file creator, enters a metalabel "Pictures/dad/baby" for the electronic file 35. In this example, the electronic file 35 is a picture that includes both dad and baby, and while the placement in the traditional file structure places the electronic file in the "Baby" subdirectory 30, associating the metalabels "dad" and "baby" allows the computer to link this file with other similar metalabeled files in other subdirectories. As shown in FIG. 3, the dashed line 40 indicates the linking for the metalabels "dad". Thus a query of the metalabel "dad" provides as search results the linked files. As discussed above, the abstract directories resulting from the query for metalabel "dad" would be "2005/", "2006/", "baby/", and "mom/" as illustrated in FIG. 2.

Figure 4:
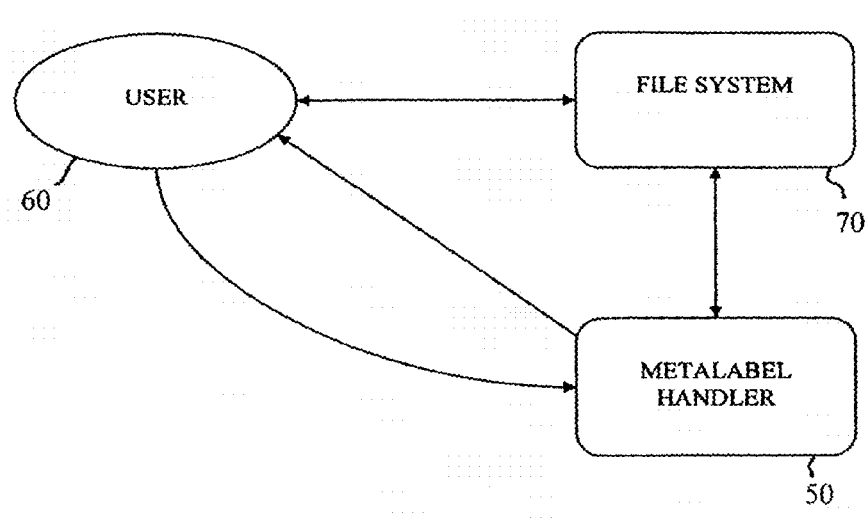
FIG. 4 is a representation of the interaction between the user and the file system according to one embodiment of this invention.

In one embodiment of this invention, a metalabel handler module or functionality, desirably implemented as a client-server module, is provided in the data processing system. As represented in FIG. 4, the metalabel handler 50 interacts with the user 60 to manage the user's metalabel manipulations, including commands such as add, modify, and remove metalabels for files. The metalabel handler 50 also desirably implements the metalabel search functions of this invention. The metalabel handler 50 interacts with the existing traditional hierarchical file structure, i.e., file system 70, to serve the requests from the client, user 60, and make the requested modifications to update the additional hierarchical file structure(s) whenever an electronic file is moved, copied, or deleted.

In one embodiment of this invention, the additional hierarchical file structures are implemented as tries, and desirably Patricia tries. In this embodiment electronic files are organized into a second hierarchical file structure by locating or creating a node in the trie that is identified with the metalabel of the file and associating the filename to the metalabel in the trie. As an alternative, and more desirably used in combination in the double trie structure discussed below, organizing the metalabel into the second hierarchical file structure is accomplished by locating or creating a node in the trie that is identified with the filename and associating the metalabel to the filename in the trie.

Figure 5:
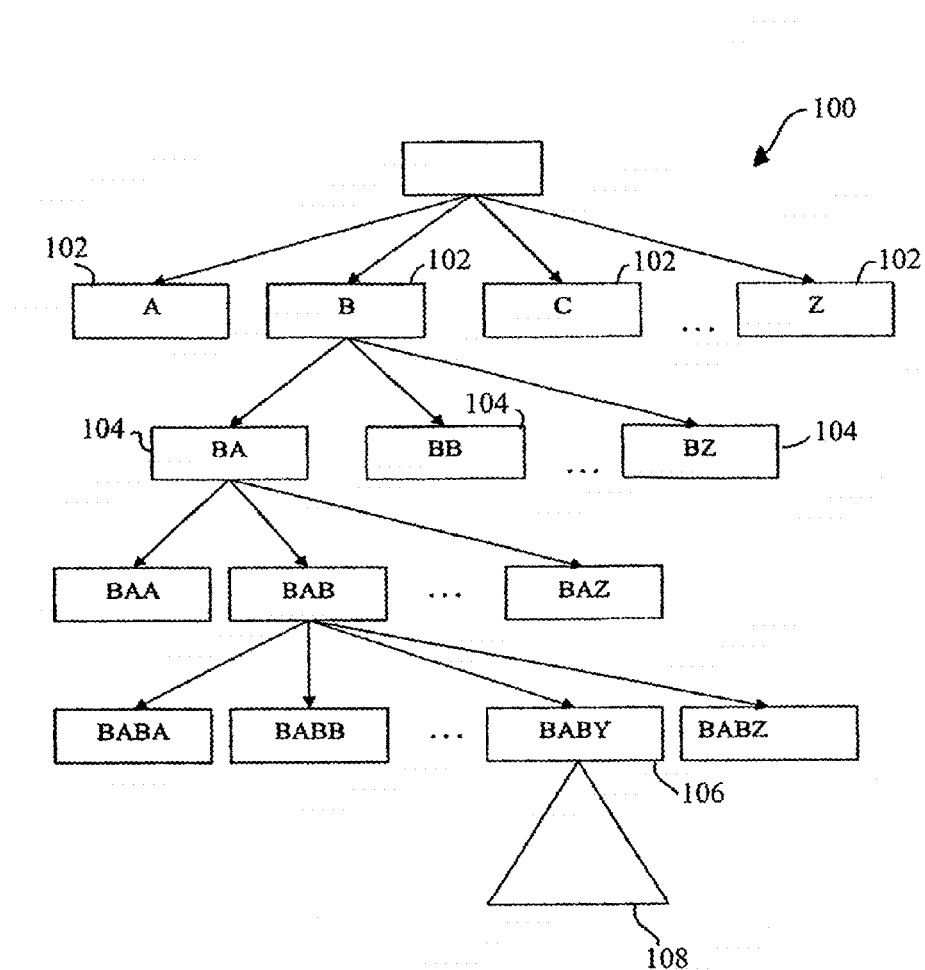
FIG. 5 is a theoretical trie structure for illustrative purposes.

FIG. 5 illustrates a general hypothetical trie structure 100 to provide a preliminary understanding to assist in the explanation of the subject invention, and is not intended to limit the invention in its application. In the hypothetical trie structure 100 of FIG. 5, there is a node 102 available for each letter of the alphabet. Note that herein the approach is illustrated using an English language character set, but one skilled in the art will recognize that any character set is possible. Referring to the node for "B", each node 102 will connect to a further plurality of available nodes 104 representing "B" plus a further letter, i.e., "BA"-"BZ". The trie structure of FIG. 5 continues in this manner and ultimately provides the node 106 for "BABY". According to this invention, the "BABY" node 106 contains the electronic files, and more accurately, the filenames and file paths of the electronic files, associated with the metalabel "BABY". The electronic files are represented in FIG. 5 by triangle 108. Thus, when a new file and/or metalabel is/are added, the data processing system organizes the metalabel into the trie structure of the additional hierarchical file structure and associates the filename with a corresponding node. The electronic file is desirably not duplicated.

Figure 6:
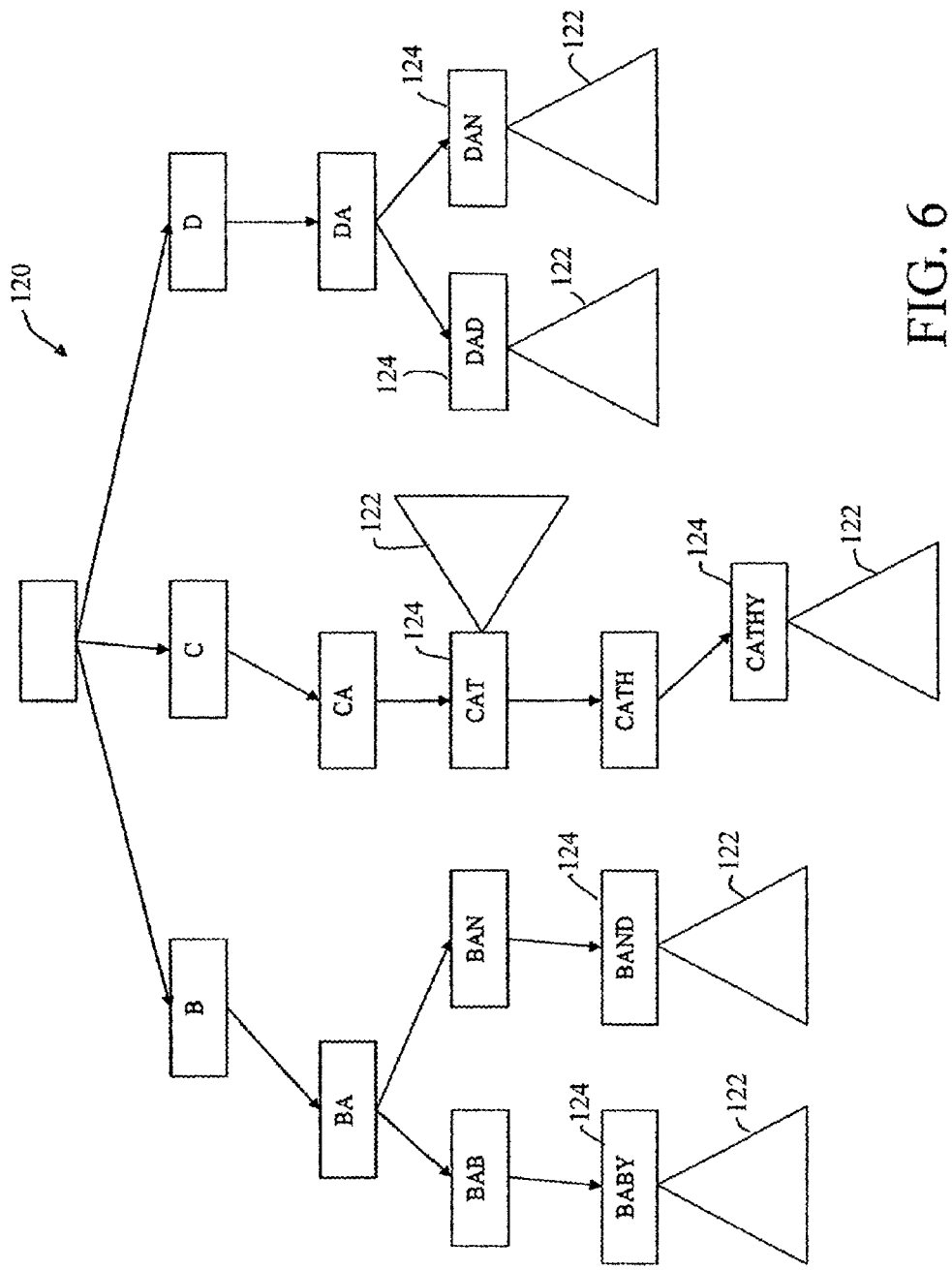
FIG. 6 is an exemplary trie structure according to one embodiment of this invention.

As will be appreciated by those skilled in the art following the teachings herein, the trie structure of FIG. 5, for preliminary explanation purposes contains nodes for potentially all combination of letters. In actual implementation, trie structures contain nodes according to need, such as illustrated in FIG. 6. FIG. 6 is an example illustration of a trie structure 120 for the metalabels "BABY", "BAND", "CAT", "CATHY", "DAD", and "DAN". In FIG. 6, only nodes related to actual metalabels are present, and unnecessary nodes do not exist. As in FIG. 5, the filenames of the electronic files are represented by triangles 122. Each triangle 122 is attached to one of the metalabel nodes 124, and includes filenames and file paths of the electronic files the user has assigned a metalabel with the metalabel matching the associated node 124.

In one embodiment of this invention, the additional hierarchical file structure is implemented as a double trie structure. Both tries of the double trie structure are desirably Patricia tries. The first trie uses the metalabels as keywords. As shown in FIG. 6, each node of the trie corresponds to a unique metalabel. Each node in turn desirably contains an internal secondary trie structure to further store a list of files that have been tagged with the specified metalabel. To provide faster results, the second trie of the double trie structure uses the filenames of the electronic files as the keywords, with the secondary trie structure, represented as the triangles in figures, containing the metalabels of the files.

For each add, modify, and update metalabel command, the trie structures are suitably modified. The file copy, move, and delete commands of a UNIX file system can be modified to create metalabeled copy, metalabeled move, and metalabeled delete commands. These commands modify the trie structures while performing the file system commands.

The following is an example of an algorithm for the double-trie implementation of the second hierarchical file structure of this invention.

Data Structures Used
 1. File Trie: a Patricia Trie, with each node possibly containing a contains-metalabel sub-trie; and
 2. Metalabel Trie: a Patricia Trie, with each node possibly containing a files-metalabeled sub-trie.

Adding a Metalabel to a File

```
addmetalabel(<filename>, <metalabel>)
    (i)    // Metalabel Trie Structure
        a. Locate the subtrie which is identified with the key
           <metalabel> in the Metalabel Trie
        b. If not found, create a node (and files-metalabeled subtrie)
           in the Metalabel Trie for the given metalabel.
        c. If subtrie already contains "filename",
               return error. (File is already tagged with the same
               metalabel)
           Else
               add "filename" to the files-metalabeled subtrie.
    (ii)   // File Trie Structure
        a. Locate the contains-metalabel subtrie corresponding to
           the given filename in the File Trie.
        b. If not found, create a node (and contains-metalabel
           subtrie) in the File trie, for the given filename.
        c. If subtrie already contains "metalabel", return error. (File
           is already tagged with the same metalabel).
           Else
               add "metalabel" to the contains-metalabel subtrie.
```

Removing a Metalabel to a File

```
removemetalabel(<filename>,<metalabel>)
    1. // Metalabel Trie Structure.
        a. Locate the files-metalabeled subtrie corresponding to the
           given metalabel in the Metalabel Trie
        b. If not found, return error. (No such metalabel found)
        c. If subtrie doesn't contain "filename", return error. (No
           such metalabel for the file).
           Else
               i. remove "filename" from the files-metalabeled
                  subtrie.
               ii. if subtrie is empty, then remove the metalabel
                   from Metalabel Trie
    2. // File Trie Structure
        a. Locate the contains-metalabel subtrie corresponding to
           the given filename in the File Trie.
        b. if not found, return error. (No such file found in index)
        c. if subtrie doesn't contain "metalabel", return error. (No
```

```
            such metalabel for the file).
        Else
            i. remove "metalabel" from the contains-metalabel
                subtrie.
            ii. if subtrie is empty, then remove the filename
                from File Trie
```

List Metalabels of a File

```
listmetalabels(<filename>)
    1. // File Trie Structure
        a. Locate the contains-metalabel subtrie corresponding to
            the given filename in the File Trie.
        b. if not found, return error. (No such file found in index)
        Else
            return the contents of the contains-metalabel subt-
rie.
```

List Files with a Metalabel

```
listfiles(metalabel)
    1. // Metalabel Trie Structure
        a. Locate the files-metalabeled subtrie corresponding to
            the given filename in the Metalabel Trie.
        b. if not found, return error. (No such metalabel found in
            index)
        Else
            return the contents of the files-metalabeled subtrie.
```

Remove File from the Index

```
removefile(filename)
    1. Set Metalabelslist=listmetalabels(filename)
    2. While metalabelslist not empty repeat
        a. remove a metalabel from the list
        b. call removemetalabel(filename,metalabel)
```

Update Index for Copy File Command

```
copyfile(src,dest)
    1. Call removefile(dest).
    2. Set Metalabelslist=listmetalabels(src)
    3. While metalabelslist not empty repeat
        a. remove a metalabel from the list
        b. call addmetalabel(dest,metalabel)
```

Update Index for Move File Command

```
movefile(src,dest)
    1. Call copyfile(src,dest).
    2. Call removefile(src)
```

Search Files with the Metalabel

```
searchfiles(metalabelslist)
    1. for each metalabel-i element of metalabelslist
        a. get files-i=listfiles(metalabel-i)
        b. if files-i == empty
            return null
        c. sort files-i
    2. get fileslist by doing a "incremental intersection" of all files-i
    3. return fileslist
```

In another embodiment of this invention, the second trie, File-Trie, is replaced with a change in the basic file system. The directory of the Linux/Unix file system is modified to incorporate meta-information. An extra field is added in the structure corresponding to the directory class. This stores meta-information. Information about the amount of data is also stored and indirect addressing is applied at the end and a pointer to a file containing extra information is stored. The data blocks of the directory desirably points to the directory structure. The directory structure of the file system, Ext2 is:

```
struct EXT2_DIR_ENTRY {
    DWORD inode; /* Inode number */
    WORD rec_len; /* Directory entry length */
    BYTE name_len; /* Name length */
    BYTE file_type;   /*File type */
    char name[EXT2_NAME_LEN]; /* File name */
};
```

The directory entries are the array of struct EXT2_DIR_ENTRY. The size of the each structure is given by the rec_len.

```
inode:- The inode number of the entry.
rec_len:- The length of the record.
name_len:- The length of the name of the file.
name:- The name of the file. The string is not NULL terminated.
```

The above entry is modified to include 2 more fields:

```
WORD    metalabel_len; /* Length of the metalabel field */
char    metalabels[ ]; /* The metalabels associated with this file */
```

Whenever the copy or move (rename) command is called, the "metalabels" structure corresponding to the files involved must also be updated. The get-metalabel, and set-metalabel commands, read/update the directory inode-structure. To convert the current file-system to the abstract-file-system of this invention, each directory in the current file system must be pre-processed to take care of the new fields.

The method of this invention is desirably performed by a data processing system. The steps the system user would take are the steps of entering the desired metalabels and entering the query. The system would desirably perform the steps of: providing the electronic file in a first hierarchical file structure; assigning the user-entered metalabel to the electronic file; organizing the electronic file into the second hierarchical file structure as a function of the metalabel; receiving a query from a user; searching the second hierarchical file structure as a function of the query; and/or returning to the user the electronic file(s) having the metalabel matching the query.

The method of this invention is desirably executed and implemented in a data processing system by software program code that is desirably stored on a computer-readable medium, such as a hard drive. In one embodiment of this invention, a computer-readable medium encoded with instructions for organizing a plurality of electronic files of a data processing system includes a first program code that, when executed by the system, establishes a first hierarchical file structure including the plurality of electronic files. As discussed above, each of the plurality of electronic files is identified by a filename and/or file path in the first hierarchical file structure.

A second program code establishes a second hierarchical file structure, and desirably a plurality of additional hierarchical file structures, including the plurality of electronic files, each of the plurality of electronic files identified by a user-defined metalabel in the second hierarchical file structure. The program codes operate simultaneously, and the first and second hierarchical file structures exist simultaneously in the data processing system for the plurality of electronic files. The medium also includes a third program code for searching the second hierarchical file structure according to a user entered query.

As discussed above, in one embodiment of this invention, the second program code establishes a second hierarchical file structure comprising a trie with a plurality of nodes. Each of the nodes of the trie corresponds to one of the user-defined metalabels, and each of the nodes comprising an internal trie structure of the electronic files that have a matching metalabel.

The present invention is described in further detail in connection with the algorithm described above and the following results on various sample metalabels and queries which illustrate or simulate various aspects involved in the practice of the invention. It is to be understood that all changes that come within the spirit of the invention are desired to be protected and thus the invention is not to be construed as limited by these examples.

Algorithms for two types of metalabel searches were implemented on a Linux system: one for an abstract file system with no hierarchical metalabels and the other with hierarchical metalabel, as described above. The file system was populated with 10K and 100K files in the two experiments. Each of these search mechanisms were implemented in two ways, one where the system loaded the search program at search time, and the other where a client-server model was developed and the search procedure was implemented as a daemon process. In the first approach, both the query and total execution time (data loading and query) are reported.

In the system with no hierarchical metalabels, the system was augmented with a suggestion mechanism, where the union of all metalabels that were present in the reported files, which matched the search (metalabels), was also reported. The tests included times taken for both kinds of this system.

In the hierarchical system, the suggestions are always included for further refinement of the search. The suggestions include metalabels which are possible predecessors or successors of the current metalabel provided at the search query.

The efficiency of the method is evident from the time required to execute the search. For a system with 100K files, typical queries would require milliseconds. Even if the reported abstract folders contained files on the order of tens of thousands, the time required is less than a few seconds. Naturally these times would improve with utilization of well-known techniques for client-server programming such as caching. Further improvements arise from replacing the second trie structure with the modified mode structure as described above. Note that all changes to the files and metalabels are immediately reflected in the system.

| | No Hierarchical Metalabels All times in ms | | | | | |
|---|---|---|---|---|---|---|
| Index File Size | | 10k | | | 100k | |
| Query | Dad | Others | photo | Dad | others | photo |
| Number of Files reported | 359 | 1258 | 420 | 14233 | 20132 | 16076 |
| Load at Query Time: | | | | | | |
| Search With Suggestion- (other applicable metalabels displayed) | 14 | 54 | 22 | 790 | 1206 | 892 |
| Without Suggestion | 7 | 28 | 9 | 330 | 586 | 485 |
| Query Time + data loading | | | | | | |
| With Suggestion- (other applicable metalabels displayed) | 172 | 209 | 199 | 3236 | 3870 | 3634 |
| Without Suggestion | 163 | 183 | 167 | 2930 | 3285 | 2952 |
| Client-Server model: | | | | | | |
| With Suggestion- (other applicable metalabel displayed) | 17 | 66 | 25 | 1284 | 2182 | 1813 |
| Without Suggestion | 9 | 33 | 16 | 363 | 605 | 505 |

| | Hierarchical Metalabels All times in ms | | | | | |
|---|---|---|---|---|---|---|
| Index File Size | | 10k | | | 100k | |
| Query | dad/ | others/ | uncle/ others | dad/ | others/ | uncle/ video |
| Number of Files | 359 | 0 | 60 | 2745 | 0 | 571 |
| Load at Querytime | 18 | 12 | 13 | 96 | 44 | 55 |
| Search Query time +_Data loading | 179 | 167 | 165 | 2633 | 2533 | 2535 |
| Client-Server model: | 32 | 24 | 25 | 145 | 89 | 99 |

Thus, the invention provides a method for improved file searching through implementation of additional hierarchical file structures that exist in the background of a data processing system alongside the traditional hierarchical directory tree file structure.

The method and apparatus of this invention can be expanded to include electronic files and/or websites of multiple users, such as across multiple server computers, aggregated in additional hierarchical file structures of this invention. For example, metalabels of a first user for files or websites on a first computer system can be organized with metalabels of a second user for files or websites on a second computer system. The additional hierarchical file structures of the multiple users' metalabels can be maintained and stored by a taxonomy handler on either or both of the first or second user, or on a third user's computer system. The multi-user hierarchy structure of this invention can be applied to unstructured user data as well as structured user data.

Figure 7:
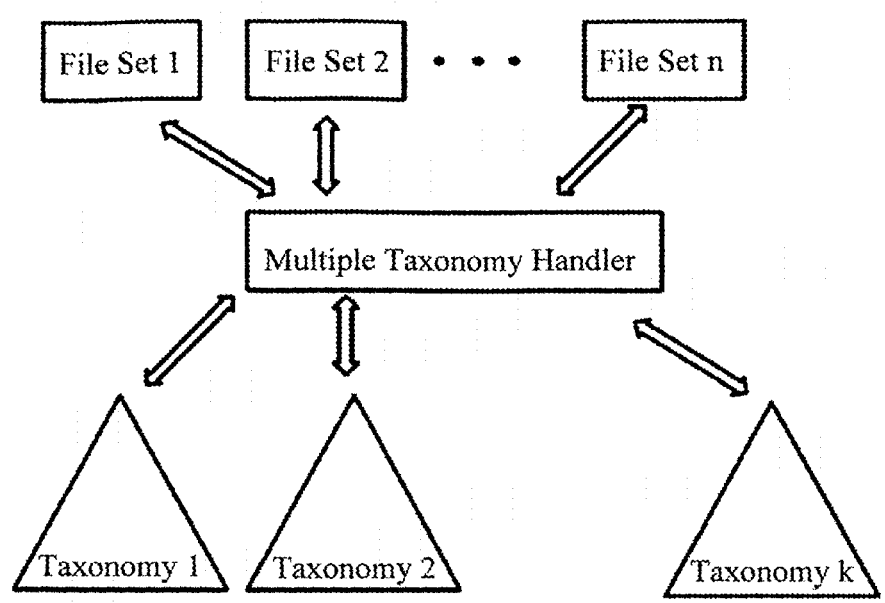
FIG. 7 illustrates a multi-user file structure according to one embodiment of this invention.

FIG. 7 illustrates a multi-user file structure according to one embodiment of this invention. A taxonomy handler, including a processor and database, aggregates metalabels of file sets 1, 2, . . . , n into multiple hierarchical file structures according to this invention. In one embodiment of this invention, each of the file sets 1, 2, . . . , n belongs to one of a plurality of users, such as each operating a separate computer system, and the taxonomy handler is operated by a third party remote from the users, and/or a logically separate computer. Each of the taxonomy hierarchical file structures is specified by a metalabel of the type A/B/C/ . . . /n, where A, B, C, etc. are individual metalabel identifiers. The multiple taxonomy structure is an aggregate of these structures, and can incorporate features of the invention discussed previously for additional hierarchical file structures.

In one embodiment, each of the metalabels in the multiple hierarchies (taxonomies) is associated with a file space identifier. Individual taxonomies can be stored on multiple systems and a union of the taxonomies is stored in the multiple taxonomy handler which aggregates multiple and overlapping taxonomies. While in traditional UNIX systems a hierarchical file space is constructed via nodes termed i-nodes, the system of embodiments of this invention maps the filespace identifier to a file/data location by an underlying file management system. The construction of a mapping between identifiers and the aggregate taxonomy can be achieved via database, a specific search structure like tries, or B-trees on an order encoded space.

The method and file structure of this invention can be further applied to the organization of web pages or members of web sites such as social networking sites. Current web-based "social networking" involves groups of people who share a common interest. Most social networking systems form groups, within a web site such as www.twitter.com or www.facebook.com, and a particular person may belong to a number of groups within those web sites. In one embodiment of this invention, the metalabels and hierarchical file structure of this invention can be used to provide an efficient methodology for organizing groups, thereby allowing users to exist in, organize, and efficiently and/or simultaneously participate in multiple groups.

The simultaneous membership in multiple groups is useful when a user's activities are common to a number of groups. As an example, consider a user Alice who has structured her set of groups into a hierarchy where the groups in the hierarchy could be categorized as A1/B1/C1, A1/B1/C2, A1/B2/C3, A1/B2/C4. A user Jane in Alice's group C1 may also occur in Alice's group C4. Alice may want to follow the conversations of Jane in both groups. This would be required with only one instantiation of Jane in her network. Jane can be advised of Alice's inclusion in a group, and in at least some implementations must agree to be part of both groups. It is also possible to limit Jane's interaction to one group. The data corresponding to a user could be real-time and/or may include cached or stored copies. The invention thus provides a hierarchical organization of groups with the power to simultaneously access data streams in multiple groups for efficient management of social groups.

Figure 8:
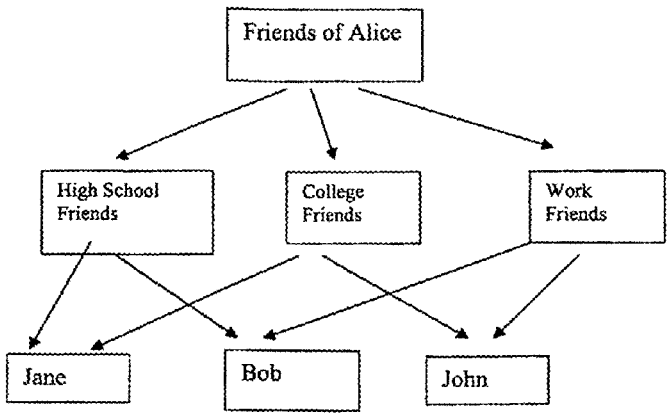
FIG. 8 illustrates a hypothetical social group structure.

FIG. 8 illustrates a hypothetical social group structure for explanation purposes. Alice would like to organize her social structure in the manner shown in FIG. 8. Alice can assign a metalabel of her creation for each of her friends who are also members of the social networking web site. As an example, Alice can assign the metalabels "high school" and "friends" to each of Jane and Bob, and "work" and "friends" to Bob and John. This metalabel is in addition to, i.e., does not replace, the web site user member identification name of Alice's metalabeled friends. The metalabels are also desirably abstract terms used to organize the metalabeled friends in the abstract hierarchical file structures of this invention. The metalabel is not replicated data, but a new identifier for each friend assigned by Alice. As noted in this example, more than one web site user can be assigned the same metalabel, thereby allowing for grouping according to the common metalabel.

Once the metalabels are created by Alice for her friends, a computer system automatically organizes and stores the user-defined metalabels in a hierarchical file structure. The computer system is desirably operated by the web site as a service to its users, but the hierarchical file structures of this invention could also be implemented on Alice's personal computer system or even through a third party web service. As discussed, the hierarchical file structure includes a trie, wherein a node in the trie that is identified with each metalabel is located or created. The computer system associates the corresponding web site member to the metalabel in the trie.

The stored links between the web site members and their corresponding metalabels organized and stored in the hierarchical file structure allow for quick searching of one or more members associated with a metalabel by searching for the metalabel. By searching for the metalabels, a user can quickly find other web site members associated with the metalabels, and optionally can automatically have a graphical user interface displayed with full or partial communications or other postings from the corresponding users.

In another embodiment of this invention, the metalabels and hierarchical file structure of this invention can be used to limit postings from one social group to that group and not to be seen, at least automatically or easily, by another established social group. A method of organizing and . displaying web site member data streams in this fashion is possible via a multiple simultaneous metalabel tagging system of this invention. Referring again to FIG. 8, Alice can organize her online social structure so that Jane's conversations are followed by other high school friends and college friends but not by work friends. Additionally John's conversations are relevant to both work and college friends. By grouping the web site members that Alice is following, she can limit access to those groups to relevant web site members and keep other web site members who are following her from seeing communications or other postings from the grouped members.

Figure 9:
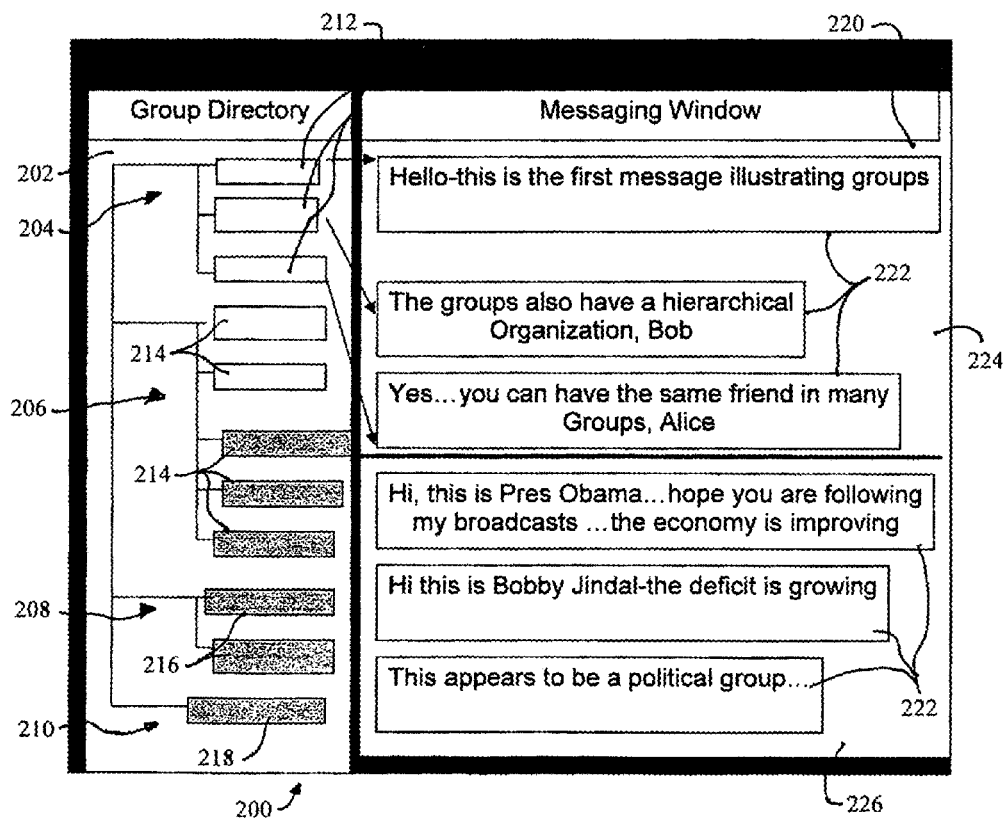
FIG. 9 illustrates an exemplary screen display of a graphical user interface according to one embodiment of this invention.

In one embodiment of this invention, a user's social groups that are established using the metalabels of this invention can be displayed to the user generating a graphical user interface (GUI) illustrating the groups or metalabels of the hierarchical file structure. FIG. 9 illustrates an exemplary illustration of screen display of a GUI 200 for displaying the metalabel groups of a user. The GUI 200 includes a group directory display 202 illustrating the groups 204, 206, 208, 210 and the group members 212, 214, 216, 218 within the groups, respectively. On the right side of the GUI 200 is messaging window 220 for displaying communications 222 from group members posted to the web site. In the embodiment shown in FIG. 9, the messaging window is divided into two portions 224 and 226. First portion 224 includes communications 222 from group 204, and the communications 222 in the second portion 226 are generated and viewed by group 206. While this particular GUI 200 shows messages to the user for two groups, the members of one group would not be able to view the messages unless those members were also in the other group. As will be appreciated, the configuration and content of the GUI can vary depending on need and the number of user-defined metalabel groups.

Figure 10:
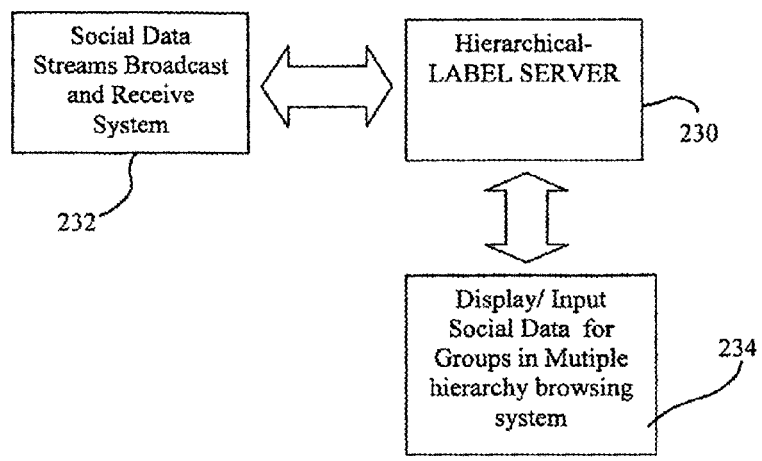
FIG. 10 is a general representation of an exemplary apparatus for implementing a metalabel system according to one embodiment of this invention.

An exemplary apparatus for implementing the above metalabel system is generally represented in FIG. 10. A label server 230 including or associated with a data processor and a database or recordable medium is used for receiving and storing user-defined metalabels for each of a plurality of web site members. The label server 230 includes software code stored on a recordable medium of the label server 230 and executable by the label server 230 for establishing and maintaining one or more hierarchical file structures. The label server 230 is in communication with a system for broadcasting and receiving data streams 232, such as those existing in current social networking sites. The label server 230 also includes software code stored on a recordable medium of the label server and executable by the label server for creating a graphical user interface for displays on a user interface of a client device. As an example, the label server 230 can include or be associated with a browser 234, which navigates the social groups and displays interactions in a trie-based hierarchical file structure according to this invention.

In another embodiment of this invention, the metalabels of this invention are applied to web pages themselves to be structured into multiple hierarchical file structures using the user-defined metalabels. Given the increasingly complex structure of local and Internet web-pages, web-pages can be viewed as a file system linked in a graph structure which corresponds to the possible access structure of the pages. This is inherently the only structure available in the architecture of web-pages. Visitors to a web-site are often faced with a myriad of web-page traversals to discover the page of interest. Information management and access thus appears to be a key issue in the "jungle" of web-pages.

Metalabel-based hierarchical data structures of this invention can be viewed by a browser system and provide alternate views of an interconnected set of web-pages that are typically found on the site of large organization. While searching for web-pages can be achieved via a search for relevant keywords, a structured view of the arrangement of web-pages has its own advantages. Often it would be easier to access structured and labeled data than search for a "needle in a haystack," which search engines are adept in doing. Consider a similar problem in the organization of files. File systems achieve a level of data organization by using a tree to provide a hierarchical and structured arrangement. Traditional file systems, including both UNIX and its variations (LINUX, etc.) and WINDOWS, have the most natural mechanism for organizing data: one hierarchical method of file organization, which is tree structured with directories and sub-directories.

This single method of organizing data leads to considerable inefficiencies in accessing files. This problem can be addressed by the additional abstract file system of this invention where hierarchical metalabels are introduced to specify multiple hierarchical organizations. The abstract file system of this invention can also be applied to web pages, which can be labeled manually or automatically by data processors, such as by a method of crawling the web-pages in a domain to extract terms as metalabels or collect the web-sites predefined metalabel data, and to provide a search/browse facility so as to enable the user to view/browse and access any indexed or labeled web-page.

Figure 11:
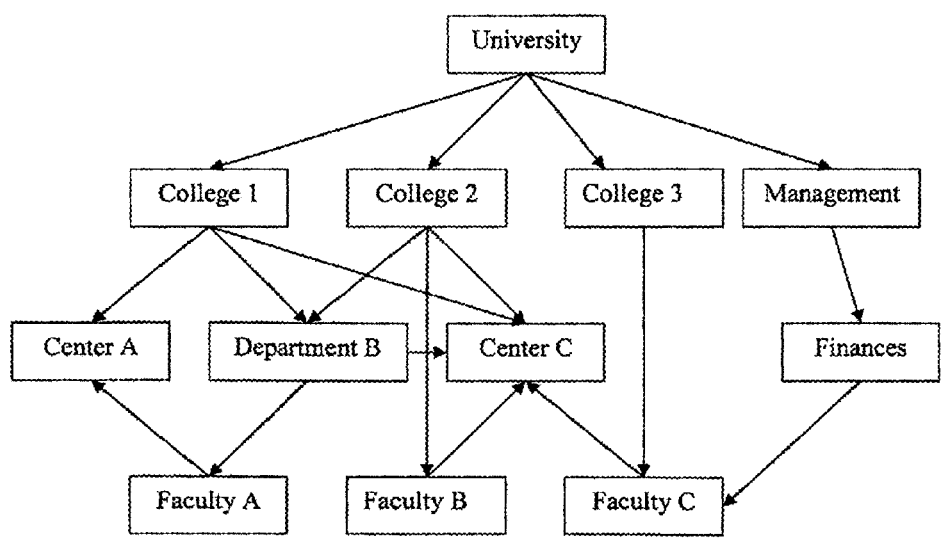
FIG. 11 illustrates a hypothetical University web-page structure.

FIG. 11 is provided as an exemplary structure of a University's web-pages for discussion purposes. Suppose an Internet user wanted to access information about Center A of the University. The web-design would require a number of link traversals, such as from a home page. If direct links from all pages to other pages are not provided, the task of page traversals becomes complicated and cumbersome. This motivates the creation of a page browser. The traditional browser however cannot represent the graph structure above. Instead, the metalabels and multiple hierarchical file structures of this invention can be used to label pages and provide a user-specified hierarchy that creates a page browsing system.

In one embodiment of this invention, a hierarchical web-page view (HWV) structure is provided. The HWV structure provides the facility to label web pages with metalabels which can be used to provide a hierarchical view of the structure of the web-pages. For example, assigning metalabel tags for the web pages in FIG. 11 could include:
University/College1/Department B/Faculty A
University/College2/Department B/Faculty A/Center A
University/College3/Faculty C
University/College3/Faculty C/Center C
and would provide an abstract directory structure. In one embodiment of this invention, a folder view of all these pages would then be provided with abstract folders for University containing sub-folders for College1, College2, etc. along with links to the pages.

Figure 12:
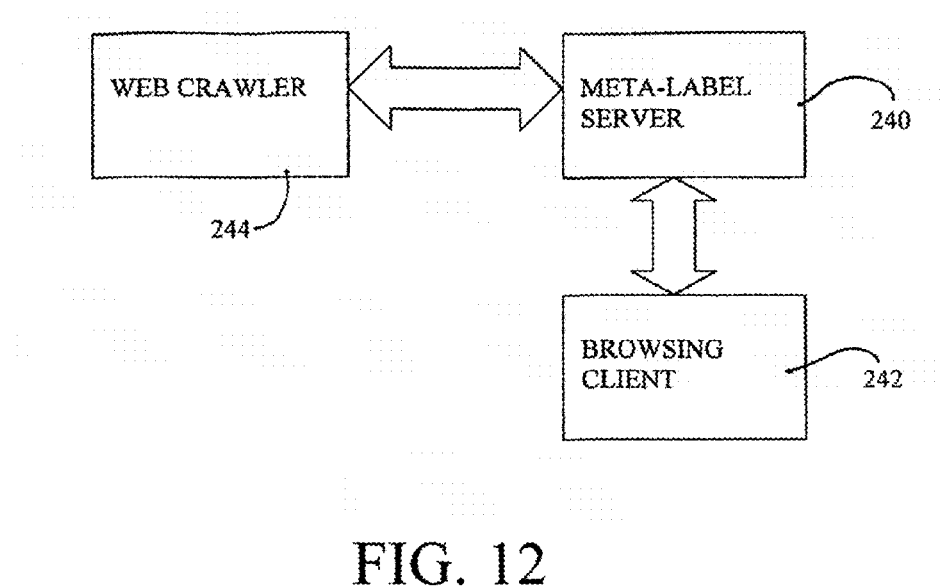
FIG. 12 is a general representation of an exemplary apparatus for implementing a metalabel system according to another embodiment of this invention.

An implementation architecture of HWV according to one embodiment of this invention includes a web-scan system, a hierarchical-label server, and a web-browser client. Referring to FIG. 12, the web-scan system comprises a label server 240 and a browser 242, such as described above. The web-scan system is embodied as a web-crawler 244 that provides for a periodic scan of all web-pages to access or create metalabel information. In one embodiment of this invention, the web-crawler 244 extracts text from web pages to automatically create metalabels. In another embodiment, web page owners or administrators can apply metalabels to their own web pages, and the web-crawler 244 can extract these metalabels when the web site it accessed. The metalabel information is collected and made accessible to the label server 240. The web crawler 244 provides a web-graph traversal system which will crawl the linked pages and extract from each page a hierarchical metalabel. The hierarchical metalabel will be embedded in the html-code with a distinguisher. This would be standard based and uniquely identifiable. The web-scan systems can be implemented as a standard graph search algorithm.

The label server 240 of one embodiment of this invention is a server for storing metalabels, methods and code for updating metalabels, including addition, deletion, and editing, and a search facility for web-pages corresponding to metalabels. The label server would interact with browser 242 as a Client-Server system. The label server 240 is implemented as a double-trie system, with two tries which would maintain a doubly-indexed database of web-pages and their corresponding metalabels. For each add, modify, and update metalabel tag command, the trie structures are suitably modified. The data modifications for the server are fed by either the web-browser or by an administrative client.

Browsing the web-pages is provided by a browser client 242. A link to activate the client 242 can be embedded into any web-page, typically the home page of the organization. This would activate client 242 which would then be able to extract metalabel hierarchical information from the server and display the structure of the web-pages. The user can access web-pages directly via links from the browser 242. Searching and browsing the multi-hierarchical labels would then be accomplished via standard browsing facilities of directory structures. The browsing client 242 can be implemented as a web-based GUI that provides a hierarchy browsing system similar to the Explorer system used in Windows and Linux graphical user interfaces.

Figure 13:
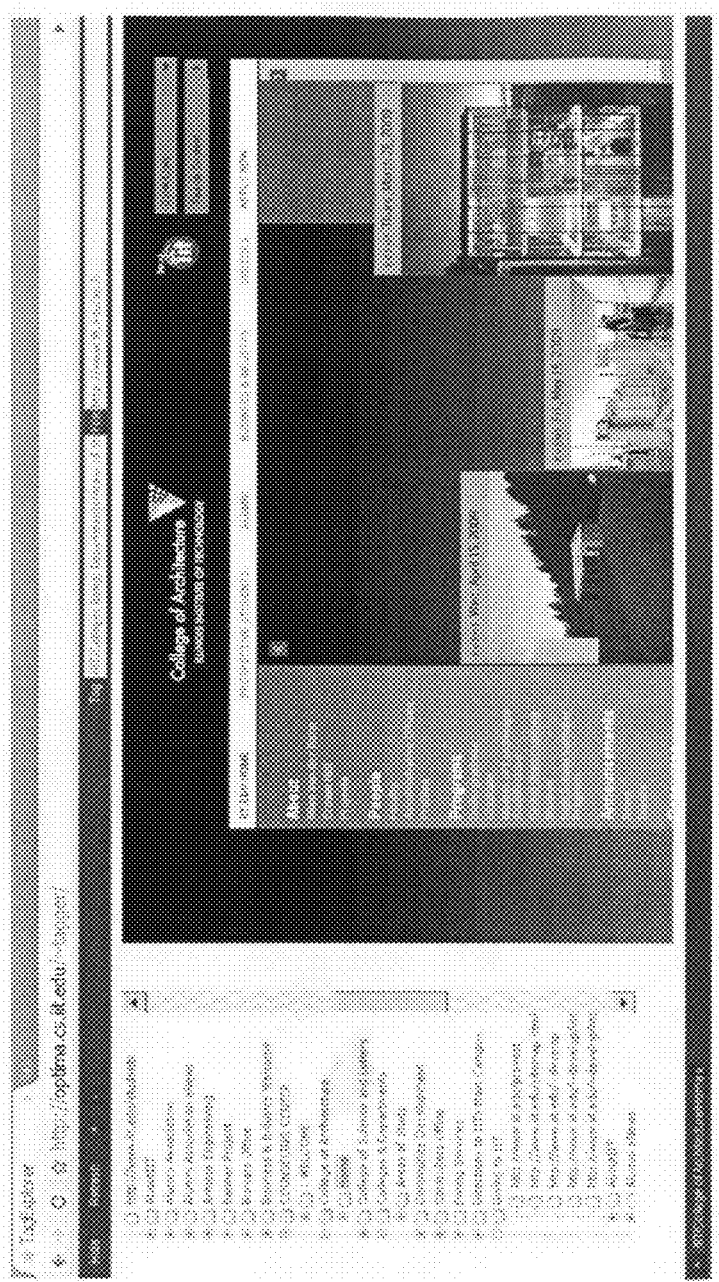
FIG. 13 is screen display of an implementation of a metalabel file structure for a web site according to one embodiment of this invention.

An administrative client would be a browser with additional features to allow for changing metalabels. To maintain consistency this would entail modifying web-pages automatically to update their meta-labels and administrative privileges would be required. Thus, the metalabel specification of the web-pages can be specified and edited from the page itself or via an administrative client. A screen display from an implementation of the system is illustrated in FIG. 13.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A device, comprising:
one or more processors;
memory; and
one or more programs, wherein the one or more programs are stored in the memory and configured to be executed by the one or more processors, the one or more programs including:
instructions for creating a graphical user interface including a first window and a second window, wherein the first window comprises a directory display of a plurality of metalabels defined by a user, and the second window comprises a message window for displaying electronic files or data items corresponding to the plurality of metalabels, wherein the directory display comprises a structure displaying a metalabel hierarchy, wherein each metalabel component of the metalabel hierarchy is selectable to display a corresponding electronic file or data item in the second window, and each of the first window and the second window can be independently controlled.

2. The device according to claim 1, wherein the electronic files comprise electronic communications.

3. The device according to claim 1, wherein the graphical user interface is displayed in a browser on a client device screen across a network.

4. The device according to claim 1, wherein the first window comprises abstract folders and subfolders each corresponding to at least one of the plurality of metalabels.

5. The device according to claim 1, wherein the second window comprises a plurality of message windows, wherein each of the message windows is associated with at least one of the metalabels of the first window.

6. The device according to claim 5, wherein each of the first window and the plurality of message windows can be independently controlled.

7. The device according to claim 1, wherein the data processor automatically updates metalabel hierarchies upon any change made to the electronic files or data items within the second window.

8. The device according to claim 1, further comprising instructions for user searching of the plurality of metalabels by one or more of the metalabels, wherein the graphical user interface comprises a search bar.

9. The device according to claim 1, further comprising a label server that receives and stores the plurality of metalabels for each of the electronic files.

10. The device according to claim 9, wherein the label server includes one or more programs including instructions for establishing and maintaining one or more hierarchical file structures for the plurality of metalabels.

11. The device according to claim 1, further comprising a web-scan system for automatically scanning remote web pages on a network and creating metalabels for each of the web pages from text extracted from that web pages.

12. A device, comprising:
one or more processors;
memory;
one or more programs, wherein the one or more programs are stored in the memory and configured to be executed by the one or more processors, the one or more programs including instructions for creating a graphical user interface including a first window and a second window, wherein the first window comprises a directory display of a plurality of metalabels defined by a user, and the second window comprises a message window for displaying electronic files or data items corresponding to the plurality of metalabels, wherein the directory display comprises a structure displaying a metalabel hierarchy, wherein each metalabel component of the metalabel hierarchy is selectable to display a corresponding electronic file or data item in the second window; and
a taxonomy handler including a database and receiving and storing user-defined metalabels for electronic files or web pages in user file structures of a plurality of users, wherein each metalabel is an identifier in addition to a user filename, user file path, or a user domain address, to organize electronic files, data items, web pages, or web site members as a function of the metalabels into a plurality of additional hierarchical file structures existing simultaneously with the user file structures, wherein more than one of the plurality of electronic files, data items, web pages, or web site members is assigned a same user-defined metalabel to organize the more than one of the plurality of electronic files, data items, web pages, or web site members in a same additional hierarchical file structure.

13. A computer-implemented method of organizing a plurality of electronic files, data items, web pages, or web site members organized in a first file structure on a recordable medium, the method comprising:
assigning with a data processor a plurality of metalabels defined by a user to each of at least two of a plurality of electronic files, data items, web pages, or web site members to organize the electronic files, data items, web pages, or web site members as a function of the metalabels into a plurality of additional hierarchical file structures existing simultaneously with the first file structure, wherein more than one of the at least two plurality of electronic files, data items, web pages, or web site members is assigned a same user-defined metalabel to organize the more than one of the plurality of electronic files, data items, or web pages in a same one of the additional hierarchical file structures;
storing the plurality of additional hierarchical file structures on the recordable medium or a second recordable medium associated with the data processor;
the processor automatically linking each of the plurality of user-defined metalabels stored in the database to a corresponding electronic file, data item, web pages, or web site members of the each of the plurality of user-defined metalabels; and
automatically updating the additional hierarchical file structures with the processor when any of the plurality of electronic files, data items, web pages, or web site members is moved, modified, copied, or deleted.

14. An apparatus for organizing files, data items, web pages, or web site members, each having a primary identifier and organized in a first file structure, the apparatus comprising:
- a label server comprising a processor and a memory component database and for receiving and storing user-defined metalabels for each of a plurality of electronic files, data items, web pages, or web site members, wherein each metalabel is an additional identifier in addition to the primary identifier, used by the label server to automatically organize the electronic files, data items, web pages, or web site members as a function of the metalabels into a plurality of additional hierarchical file structures existing simultaneously with the first file structure, wherein more than one of the plurality of electronic files, data items, web pages, or web site members is assigned a same user-defined metalabel to organize the more than one of the plurality of electronic files, data items, web pages, or web site members in a same one of the additional hierarchical file structures, and wherein the additional hierarchical file structures comprise a plurality of nodes, each of the nodes corresponding to one of the metalabels, and each of the nodes comprising an internal structure of links corresponding to the metalabel of the node.

15. The apparatus of claim 14, further comprising a software code stored on a recordable medium of the label server and executable by the label server for automatically establishing and maintaining the additional hierarchical file structures.

16. The apparatus of claim 14, further comprising a software code stored on a recordable medium of the label server and executable by the label server for creating a graphical user interface for display on a user interface of a client device.

17. The apparatus of claim 14, further comprising a web-scan system for automatically scanning remote web pages on a network and creating metalabels for each of the web pages from text extracted from that web pages.

18. The apparatus of claim 14, wherein the additional hierarchical file structures comprise a plurality of nodes, each of the nodes corresponding to one of the metalabels, and each of the nodes comprising an internal structure of the links corresponding to the metalabel of the node.

19. A computer-readable storage medium encoded with instructions for organizing a plurality of electronic files, data items, web pages, or web site members, the encoded instructions comprising:
- instructions for establishing a first file structure including the plurality of electronic files, data items, web pages, or web site members, each identified by a primary identifier in the first file structure;
- instructions for establishing additional hierarchical file structures including the plurality of electronic files, data items, web pages, or web site members, each of the plurality of electronic files, data items, web pages, or web site members identified by a user-defined metalabel in the additional hierarchical file structures, each of the electronic files, data items, web pages, or web site members organized in both the first file structure and the additional hierarchical file structures without replicating the electronic files, data items, web pages, or web site members; and
- instructions for assigning a corresponding user-defined metalabel to each of the electronic files, data items, web pages, or web site members, and automatically organizing the electronic files, data items, web pages, or web site members as a function of the metalabels into the additional hierarchical file structures by linking the metalabel of a first electronic file, data item, web page, or web site member to a matching metalabel assigned to a second electronic file, data item, web page, or web site member, wherein the first file structure and the additional hierarchical file structures exist simultaneously for the plurality of electronic files, data items, web pages, or web site members;
- wherein the additional hierarchical file structures comprises a plurality of nodes, each of the nodes corresponding to one of the user-defined metalabels, and each of the nodes comprising an internal structure of the electronic files that have a matching metalabel.

20. The computer-readable storage medium according to Claim 19, further comprising instructions for searching the additional hierarchical file structures according to a user entered query.

21. An apparatus, comprising:
- one or more processors;
- memory; and
- one or more programs, wherein the one or more programs are stored in the memory and configured to be executed by the one or more processors, the one or more programs including instructions for creating a graphical user interface including a first window and a second window, wherein the first window comprises a directory display of a plurality of metalabels defined by a user, and the second window comprises a message window for displaying electronic files or data items corresponding to the plurality of metalabels, wherein the directory display comprises a structure displaying a metalabel hierarchy, wherein each metalabel component of the metalabel hierarchy is selectable to display a corresponding electronic file or data item in the second window;
- wherein the directory display comprises a plurality of nodes, each of the nodes corresponding to one of the metalabels, and each of the nodes comprising an internal structure of the links corresponding to the metalabel of the node, and more than one of a plurality of electronic files, data items, web pages, or web site members is assigned a same user-defined metalabel to organize the more than one of the plurality of electronic files, data items, web pages, or web site members in a same node of the directory display.

22. The apparatus of claim 21, further comprising a web-scan system for automatically scanning remote web pages on a network and creating metalabels for each of the web pages from text extracted from that web pages.

23. The apparatus of claim 21, wherein the electronic files comprise electronic communications.

24. The apparatus of claim 21, wherein the graphical user interface is displayed in a browser on a client device screen across a network.

25. The apparatus of claim 21, wherein the first window comprises folders and subfolders each corresponding to at least one of the plurality of metalabels.

26. The apparatus of claim 21, wherein the data processor automatically updates the metalabel hierarchy upon any change made to the electronic files or data items within the second window.

27. The apparatus of claim 21, further comprising a label server for receiving and storing the metalabels.

28. The apparatus of claim 27, wherein the label server includes one or more programs including instructions for establishing and maintaining the nodes for the directory display.

29. The computer-readable storage medium according to claim 19, further comprising instructions for automatically scanning remote web pages on a network and creating meta-labels for each of the web pages from text extracted from that web pages.

\* \* \* \* \*